United States Patent [19]

Dahod

[11] Patent Number: 4,500,989
[45] Date of Patent: Feb. 19, 1985

[54] DIGITAL COMMUNICATION SYSTEM

[76] Inventor: Ashraf M. Dahod, 21 Field Pond Dr., Reading, Mass. 01867

[21] Appl. No.: 404,039

[22] Filed: Aug. 2, 1982

[51] Int. Cl.³ .......................... H04J 6/00; H04M 11/04
[52] U.S. Cl. ........................................... 370/85; 370/96
[58] Field of Search ..................... 370/85, 86, 93, 94, 370/90, 96, 91, 95, 89

[56] References Cited

U.S. PATENT DOCUMENTS

| | | | |
|---|---|---|---|
| 3,720,790 | 3/1973 | Watson et al. | 370/85 |
| 3,870,825 | 3/1975 | Roberts et al. | 370/85 |
| 4,149,144 | 4/1979 | Diefenderfer | 370/85 |
| 4,161,786 | 7/1979 | Hopkins et al. | 370/85 |
| 4,210,780 | 7/1980 | Hopkins et al. | 370/85 |
| 4,293,947 | 10/1981 | Brittain | 370/85 |
| 4,347,604 | 8/1982 | Saito et al. | 370/85 |
| 4,387,425 | 6/1983 | El-Gohary | 370/85 |

OTHER PUBLICATIONS

B. K. Penney et al., "Survey of Computer Communications Loop Networks: Part 1", Computer Comm., vol. 2, No. 4, Aug. 1979, pp. 165-180.

Primary Examiner—Douglas W. Olms
Assistant Examiner—Wellington Chin
Attorney, Agent, or Firm—Wolf, Greenfield & Sacks

[57] ABSTRACT

A multiple access digital communication system having fixed or variable length messages each separated into message groups, each group having messages numbered from O to N and in which there can optimally accommodated, on the same network a combination of both high and low duty cycle subscribers having short or long messages. The apparatus of the system includes a signal communication link comprising a two-way bus or two one-way buses, a plurality of subscriber devices, a plurality of network interface units respective ones of which couples each subscriber device to both the communication link. One of the network interface units at any one point in time is a pacer unit which sends a control message to allow all network interface units to track the number of the message on the network. Each of the network interface units in turn comprise a data processing means and means for transmitting a plurality of network messages including message segments designating such parameters as message number, destination address, and variable message length, and means for receiving the network messages including means for identifying such parameters as destination address and message number along with a means for storing the message length. In accordance with the invention operation is in accordance with multiple modes including those which permit either fixed or variable message length and which have either both or separate dedicated and contention assignments of message number.

68 Claims, 18 Drawing Figures

Fig. 3 (A-K)

| G | MS | MN | OA | MT | ML | CRC | NM | B1 | B2 | BMN | BSP | CRC | | G |

(A) BLOCK SYNCHRONIZATION (B1 BITS)

| G | MS | DA | OA | MT | ML | CRC | NM | B1 | B2 | CRC | | G |

(B) NETWORK MODE (B1 BITS)

| G | MS | DA | OA | MT | ML | CRC | RTP | CRC | | G |

(C) RETRANSMISSION PARAMETER (B1 BITS)

| G | MS | PA | OA | MT | ML | CRC | | G |

(D) PACER ASSIGNMENT (B1 BITS)

| G | MS | DA | OA | MT | ML | CRC | TEST DATA | CRC | G |

(E) LOOP TEST (B1 ≤ B BITS ≤ B2)

| G | MS | DA | OA | MT | ML | CRC | | G |

(F) STATUS REQUEST (B1 BITS)

| G | MS | DA | OA | MT | ML | CRC | STATUS DATA | CRC | G |

(G) STATUS RESPONSE (B1 ≤ B BITS ≤ B2)

| G | MS | DA | OA | MT | ML | CRC | AMN | ASP | AAT | RSP | RAT | CRC | G |

(H) MESSAGE NUMBER ASSIGNMENT REQUEST (B1 BITS)

| G | MS | DA | OA | MT | ML | CRC | AMN | ASP | AAT | CRC | G |

(I) MESSAGE NUMBER RE-ASSIGNMENT (B1 BITS)

| G | MS | DA | OA | MT | ML | CRC | FC | DATA | CRC | G |

(J) DATA (B1 ≤ B BITS ≤ B2)

| G | MS | DA | OA | MT | ML | CRC | DATA FLOW CONTROL | CRC | G |

(K) DATA FLOW CONTROL (B1 BITS)

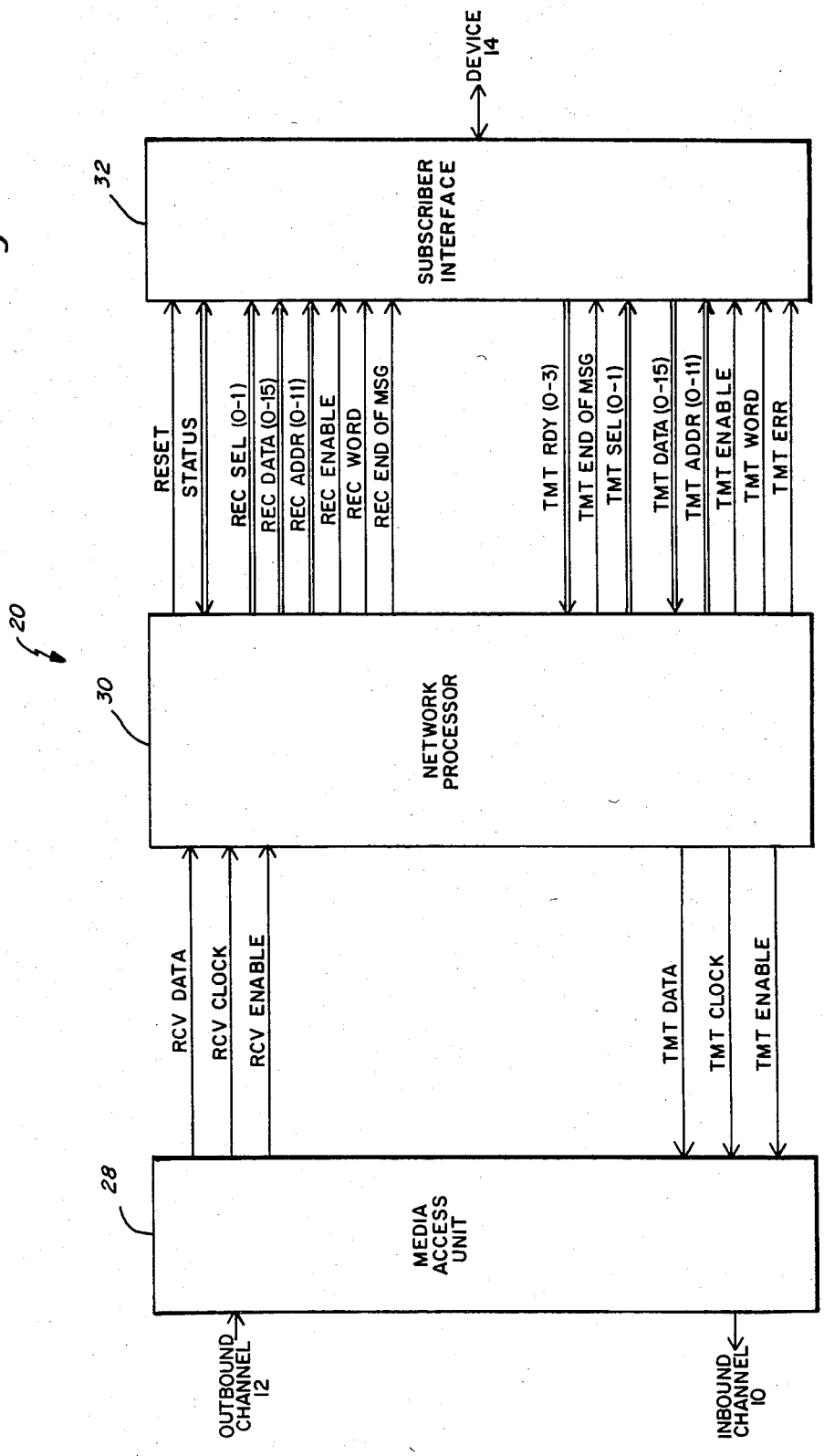

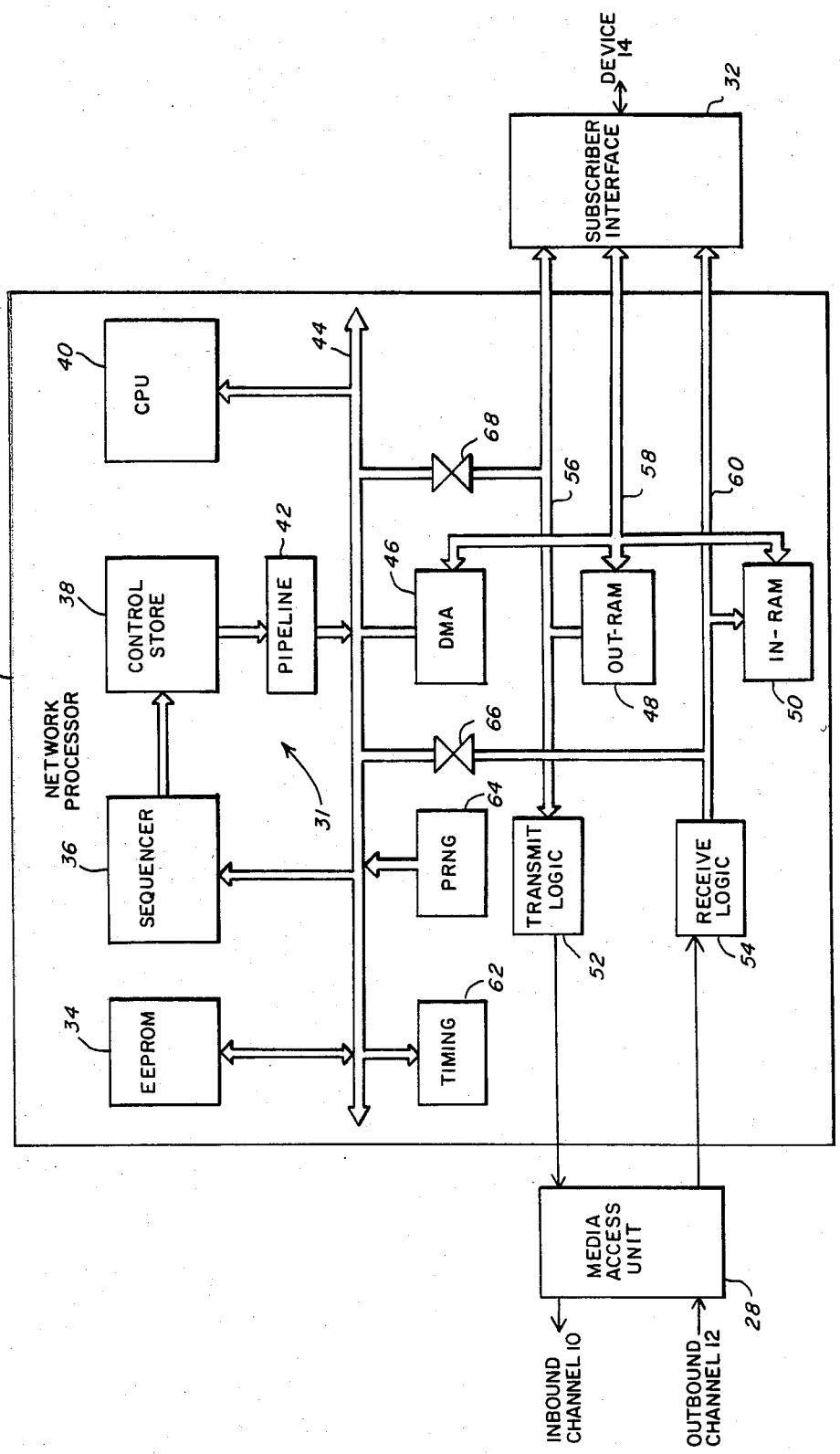

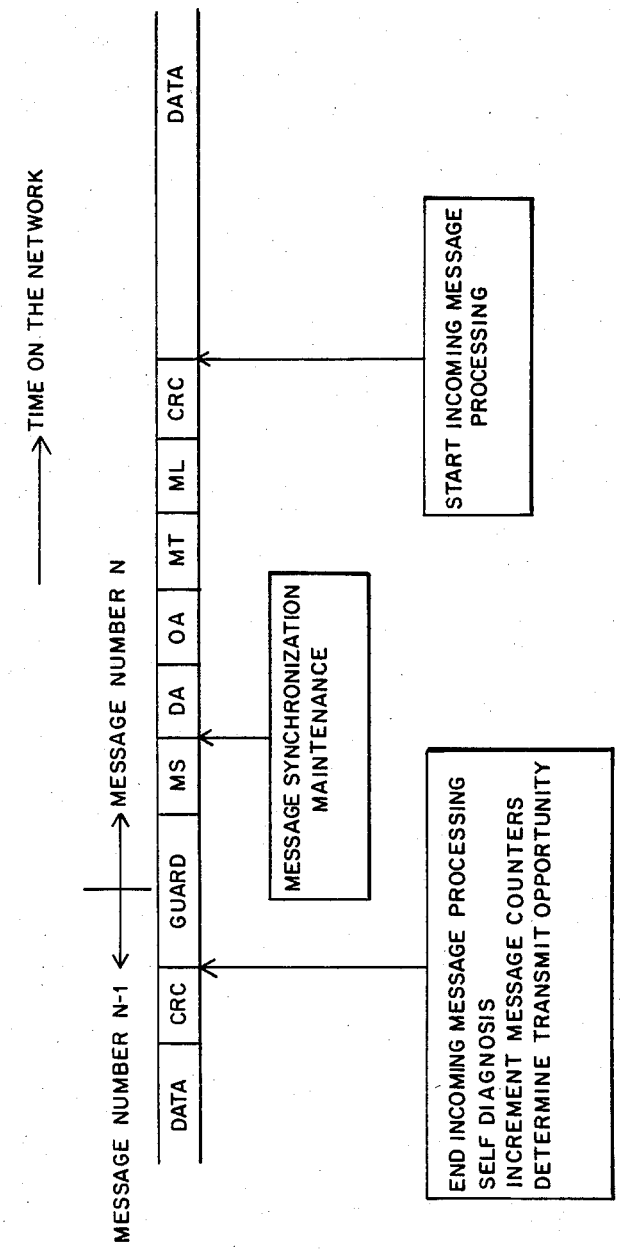

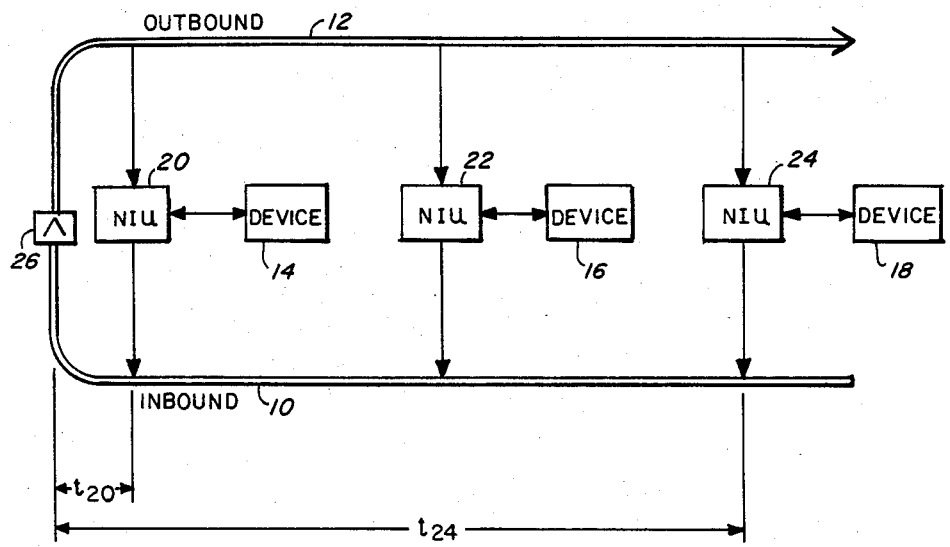
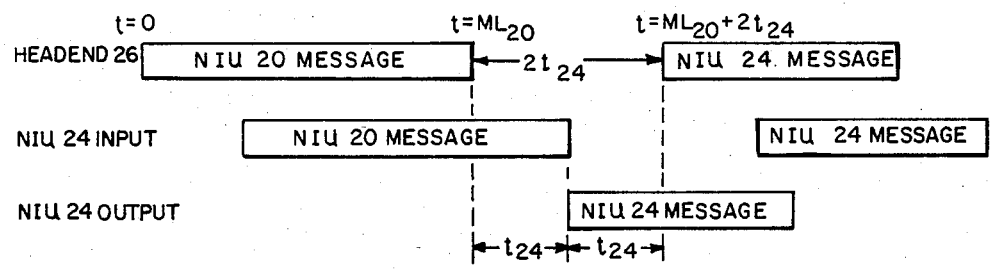
(i) WITHOUT MESSAGE LENGTH FIELD
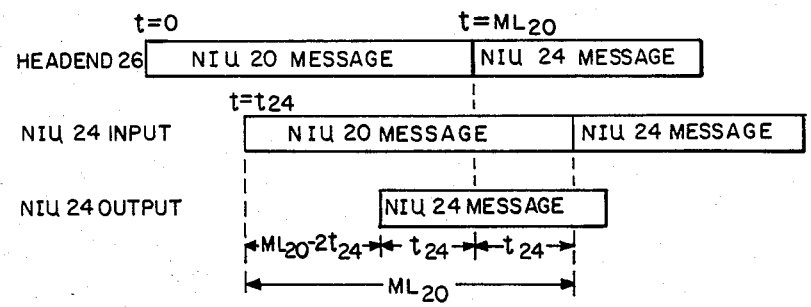
(ii) WITH MESSAGE LENGTH FIELD
Fig. 7(A)

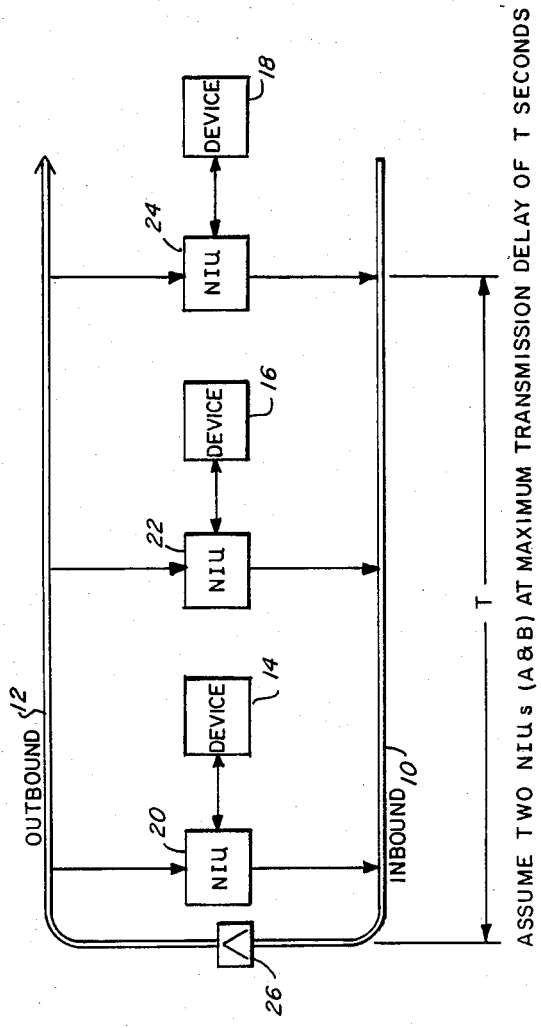
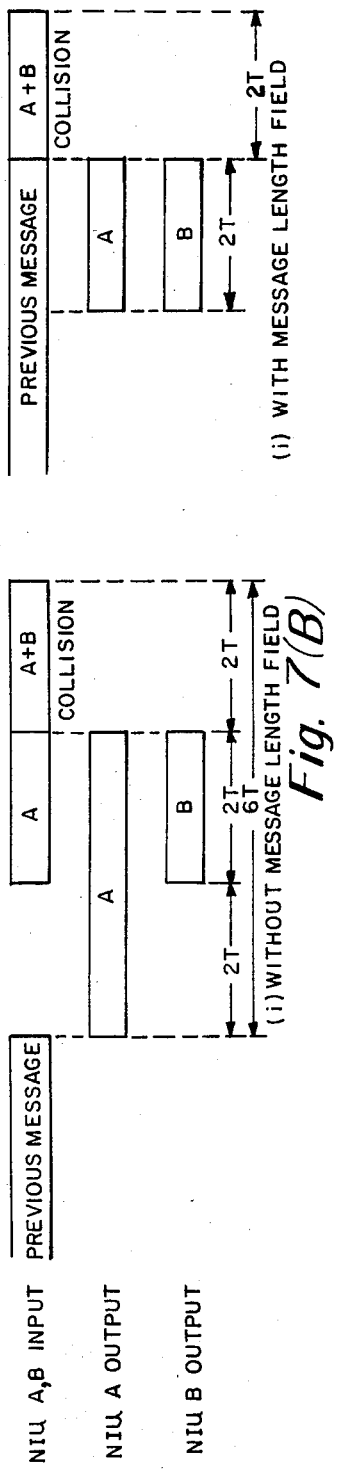
Fig. 7(B)

DIGITAL COMMUNICATION SYSTEM

FIELD OF THE INVENTION

The present invention relates in general to a communication system, and pertains more particularly to a multiple access communication system.

BACKGROUND OF THE INVENTION

Multiple access communication systems basically provide a common information network for transferring digital message signals among computers, terminals and related equipment. In prior art systems, there are a number of protocols used to accommodate the various equipment in the network and provide them with access to a communications bus. Such protocols include simple polling, priority request, contention, carrier-sensing, carrier-sensing with collision-detection, token-passing, and cyclic time-division.

In the polling type system, a central controller sequentially polls each of the subscribers (includes computers, terminals or related equipment), offering each an opportunity to access the network when available. In priority request systems, subscribers ready to transmit a message make a request, and are granted access to the network according to priorities established by an arbiter at a central controller. In contention systems, subscribers may transmit messages at random times and retransmit after a random delay in the event two or more simultaneous transmissions destroy the messages. The error caused by simultaneous transmissions may be detected by lack of acknowledgement from the destination subscriber or by monitoring the signal on the network for two or more simultaneous transmissions. In carrier-sensing systems, subscribers may transmit only when the network is idle and retransmit after a random delay if no acknowledgement is received from the destination. In carrier-sensing systems with collision-detection, subscribers may transmit when the network is idle, monitor the signals on the network, and stop transmission and retransmit after a random delay if two or more simultaneous transmissions are detected. In token-passing systems, a subscriber may transmit when it holds a special message called a "token" and at the end of its transmisson, pass the "token" to the next subscriber in a predetermined sequence. In cyclic time division systems, a subscriber may transmit in slots assigned to it from regularly occurring time slots in a repetitive framed sequence. The assignment of slots to various subscribers in the network may be centrally controlled or may be distributed among the subscribers. Further, each slot may be assigned to only one subscriber or be assigned to more than one subscriber in which case the subscribers may contend for transmission in a time slot.

The polling and priority request approaches have been applied to multiple access communication systems in the prior art whereby a central subscriber controls the bus access. However, such systems are typically characterized by a rigid formatting of messages and an inflexible set of system constraints controlling the time periods at which the various remote subscribers may gain access to the communication path. In addition, the various data rates at which the individual remote subscribers may transmit message signals are hard-wired into the system to define predetermined portions of the channel bandwidth which are allocated to each of the remote subscribers.

The contention, carrier-sensing and carrier-sensing with collision-detection protocols have been applied in the prior art to accommodate low duty cycle, or "bursty", subscribers, like terminals. In these multiple access communication systems, the entire bus bandwidth is available to a subscriber in the network. Therefore, such systems do not permit control of access to the network, which is needed to give preferential access to higher priority subscribers. Further, as the number of subscribers is increased or high duty cycle subscribers, like computers, are placed on the network, the bandwidth wasted due to collisions and the time required to transmit a message from a source to a destination subscriber increases. These factors seriously deteriorate the performance of the network. Also, in carrier-sensing and carrier-sensing with collision-detection approaches, a subscriber can determine the end of a message only after actually receiving the end of an on-going message. This forces the inter-message pause and the duration from the start of a message during which a collision could occur to be dependent on the maximum separation between the subscribers. Therefore, the utilization of the bus bandwidth is reduced as the length of the network increases.

The token-passing method has been applied in the prior art to accommodate high duty cycle subscribers, like computers. However, such multiple access communication systems do not optimally accommodate a large number of low duty cycle subscribers. Further, complex hardware is needed, in any network topology except "ring" topologies, to control the passing of the token and to recover from failure of a subscriber.

The cyclic time-division system has been applied in the prior art to permit control of access to the network and to accommodate both low and high duty cycle subscribers. However, this multiple access communication protocol requires a central controller to synchronize all the subscribers and any outage of the controller causes failure of the entire system. Further, the fixed message length results in underutilization of bus bandwidth assigned to subscribers with short messages and increased complexity for transmission of messages longer than a slot.

Typically, in operating environments, a system is required to accommodate high and/or low duty cycle subscribers having short and/or long messages. Further, a network should be adaptable to changes in an operating environment.

Accordingly, it is an object of the present invention to provide a multiple access communication protocol which not only optimally accommodates different operating environments, but is also adaptable to changes in an operating environment.

It is another object of the invention to provide a multiple access communication system which can optimally accommodate, on the same network, a combination of high and low duty cycle subscribers having short or long messages.

A further object of the present invention is to provide a multiple access communication system which will permit: optimal accommodation of high duty cycle subscribers having variable length messages without actually passing a token; optimal accommodation of low duty cycle subscribers having variable length messages including a capability to control access to the network based on subscriber priority; network operation not dependent on proper functioning of any single controller; and a system which, while allowing variable message lengths, makes the inter-message pause independent of the length of the network and the distance between the subscribers for topologies that use two one-way links.

SUMMARY OF THE INVENTION

To accomplish the foregoing and other objects of this invention there is provided a multiple access communication system which is capable of operation with fixed or variable length messages. To establish an order for transmission on the network, each subscriber is assigned one or more message numbers from a message number "block" which consists of a group of message numbers which are sequentially numbered from zero to a predetermined number, N. Each subscriber may transmit on the network in such a way that its message follows the message from the subscriber assigned the preceeding message number.

In order to determine whether an opportunity to transmit on the network exists at any given time, each subscriber "paces" the message numbers by internally keeping track of the message number of the transmitting subscriber at any point in time by monitoring the start and end of each message on the network. To insure that all subscribers properly keep in pace with the message numbers, one subscriber, the "pacer", periodically transmits a pace number during a message number reserved for this purpose which informs all subscribers as to the message number associated with the message transmitted on the network at that time. Any subscriber can become the pacer, but at any point in time, only one subscriber performs the pacing function. At network start-up when there is no pacer or when an existing pacer fails, all operating subscribers follow a predetermined procedure to determine which subscriber is to become the pacer. Subscribers whose internal message number matches the pace number are block synchronized and may transmit on the network at the appropriate time. Subscribers that are not block synchronized cannot transmit but instead follow a predetermined synchronization sequence to obtain sychronization.

In order to reduce the effect of transmission delays on the network, every message transmitted on the network contains information concerning the length of that message. All subscribers monitor the start of each message and the length information to predict the end of the current message. The subscriber associated with the next message number can therefore begin transmission of its message at a predicted time before it actually detects the end of the preceeding message. Accordingly, for topologies that use two one-way links, the inter-message pause is independent of both network length and distances between subscribers.

BRIEF DESCRIPTION OF THE DRAWINGS

The foregoing and other objects of the invention, the various features thereof, as well as the invention itself, may be more fully understood from the following description, when read together with the accompanying drawings in which:

FIGS. 3A-3K show exemplary message signal formats for use with the system of FIG. 1;

FIG. 4 shows in block diagram form an exemplary embodiment of the network interface unit (NIU) of the system of FIG. 1;

FIG. 5 shows in block diagram form an exemplary embodiment of the network processor of the NIU of FIG. 4;

FIG. 6 shows the relationship between the functions performed within a NIU and the network timing; and FIGS. 7A and 7B explain the benefits of the message length field in data communication systems that use two one-way links.

DESCRIPTION OF THE PREFERRED EMBODIMENT

Figure 1:
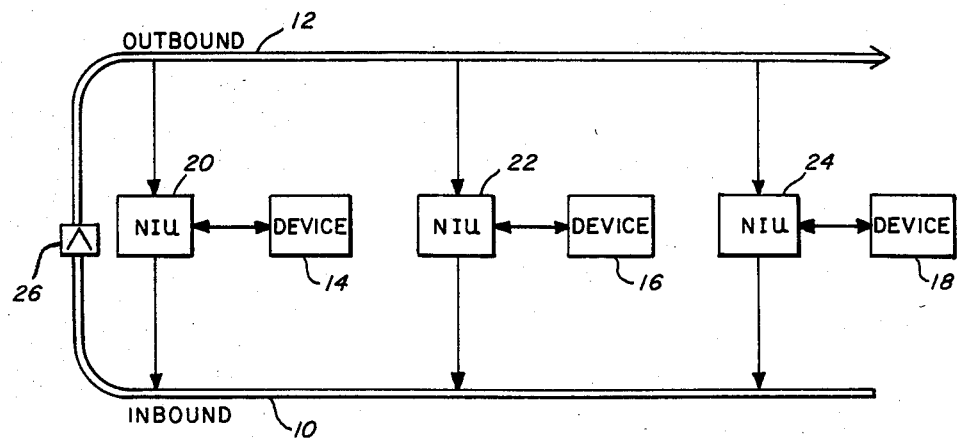
FIG. 1 shows, in block diagram form, an exemplary embodiment of a multiple access communication system in accordance with the invention.

The general arrangement of the illustrative communication system is shown in FIG. 1. The system includes a plurality of subscriber devices 14, 16 and 18 connected together by a network that includes common signal paths comprising inbound bus 10 and outbound bus 12. Although two separate one-way buses are shown, the interconnecting signal paths may be either one common two-way path or two separate one-way paths. Signal paths 10 and 12 may be any suitable communication medium such as baseband or broadband coaxial or optical fiber cables, radio links or some other medium. More specifically, inbound bus 10 and outbound bus 12 may be separate channels on a conventional wideband radio-frequency transmission system, such as a two-wire cable television (CATV) trunk/feeder network. The characteristics of such a network are well-known and the electrical components for CATV networks are available commercially.

Inbound bus 10 and outbound bus 12 are coupled at a system head-end 26 which contains well-known, highly reliable circuitry that receives incoming signals from subscribers on the inbound bus 10, and filters, amplifies and retransmits the signals on the outbound bus 12 to all subscribers.

In operation, buses 10 and 12 carry digital signals arranged in fixed formats called "messages". Each message may be either of two types: control or data and in general, in addition to control or data information, each message includes address information identifying the originating subscriber and the destination subscriber and information indicative of the message type. Control messages are used to transfer control information between subscribers. This in turn is used to control and regulate the operation of the entire system. Examples of system function regulated by control messages are the monitoring of subscriber status, remotely testing subscribers or establishing communication links between terminals. Data messages are used to transfer digital data between subscribers, generally for intersubscriber communication purposes.

Each of subscriber devices 14, 16 and 18 (of which only three are shown for clarity) are connected to both inbound bus 10 and outbound bus 12 by a network interface unit (NIU) illustrated as devices 20, 22 and 24, respectively. Each NIU and each subscriber is assigned an address so that information may be directly sent to it over the network. Although, in this embodiment, each subscriber is shown connected to a separate NIU, a plurality of subscriber devices may be connected to a single NIU, but each subscriber and each NIU is still assigned a unique address. The NIUs provide access to the data network for their associated devices and establish electrical and functional capabilities between the buses and the respective subscriber devices. In particular, each NIU contains circuitry which transmits digital information in a serial bit stream on inbound bus 10, and receives information in the form of a serial bit stream from outbound bus 12.

From the bit stream information appearing on bus 12, each NIU continuously monitors the messages on bus 12, examining the information in each message for type, destination and other information. In general, if an NIU detects a control message with a destination address that matches its address, processes that message control information internally. Alternatively, if an NIU detects a data message with an address that matches the address of one of its associated subscribers, the NIU transfers the control or data information to the appropriate subscriber.

In order to prevent mutilation of data on buses 10 and 12, only one subscriber may transmit at any one time. In accordance with the invention in order to permit orderly access to the network a message number convention is used. In particular, to establish an order for transmission on the network, each subscriber is assigned one or more message numbers from a message number "block" which consists of a group of message numbers which are sequentially numbered from zero to a predetermined number, N. The number of messages per block and the allowable length for each message are parameters which can be changed to fit the particular operating environment. Each subscriber may transmit on the network only such that its message follows the message of the subscriber assigned the preceeding message number.

The assignment of message numbers may be carried out by selected subscribers, by a central network monitor or by following a predetermined algorithm. In general, all subscribers have certain message numbers assigned to them at system start-up and, during system operation, a subscriber may be assigned additional message numbers depending on its bandwidth requirements. The message number assignments may be fixed or may vary during system operation - for example, number assignments may change after transmission of a predetermined number of messages from the time of assignment or a subscriber may internally adjust its assignments depending on the traffic on the network. Message number assignments may be "dedicated" or assigned to only one subscriber, or the assigments may be "contention" assignments or assigned to more than one subscriber.

More particularly, in the illustrative embodiment, a set of message numbers is actually assigned to an NIU associated with a subscriber by a specification of the first message number in the message block and a "spacing parameter." The spacing parameter is a 16-bit number which specifies the frequency of assignment of message numbers to the particular subscriber. It may be an integral power of two ($2^n$) and specifies whether every message number (beginning with the first number) is assigned to a particular subscriber, or every two message numbers, etc. Alternatively, it may be a displacement value in message numbers which specifies at what intervals subscriber has an allocated message number. If the spacing is an integral power of two ($2^n$), the actual spacing parameters for the illustrative embodiment are shown in Table I below.

TABLE I

| Frequency of Assignment | Value of n | Spacing Parameter (16-bit value) |
|---|---|---|
| every 1 message | 0 | 0 ... 00000 |

TABLE I-continued

| Frequency of Assignment | Value of n | Spacing Parameter (16-bit value) |
|---|---|---|
| every 2 messages | 1 | 0 ... 00001 |
| 4 | 2 | 0 ... 00011 |
| 8 | 3 | 0 ... 00111 |
| 16 | 4 | 0 ... 01111 |
| . | . | . |
| . | . | . |
| . | . | . |
| $2^n$ | n | (16-n) "0s" and n "1s" |

Figure 2:
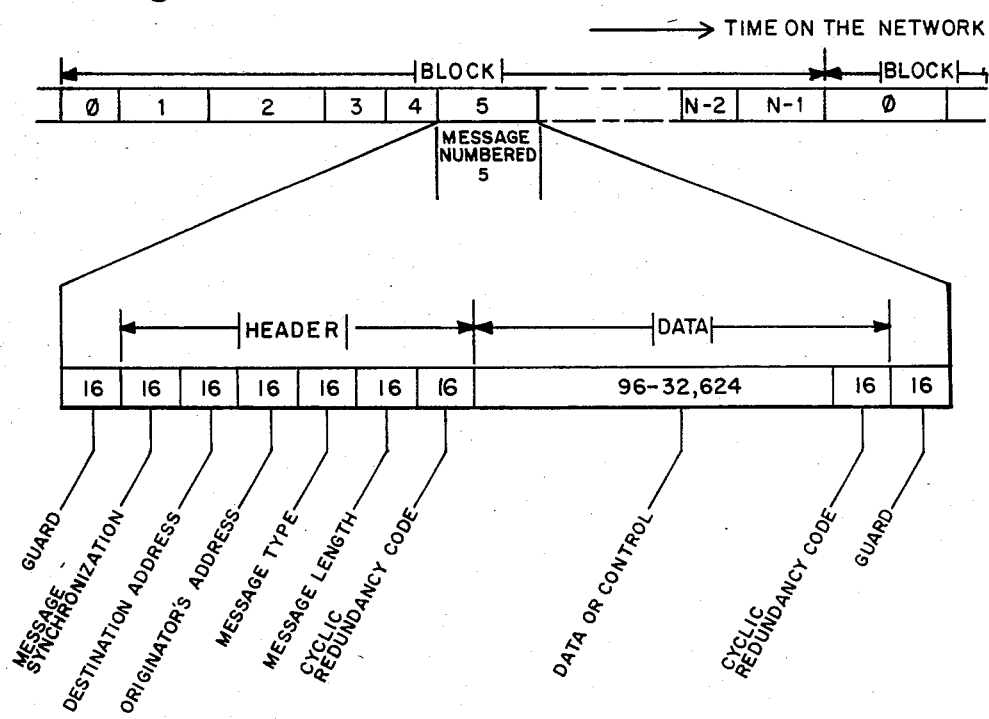
FIG. 2 shows the general message signal format for the system of FIG. 1.

The basic message format is illustrated in FIG. 2 for an illustrative system in which the overall system data rate is 10 Mbps, the message block consists of 65,536 message numbers, and each message consists of between 240 and 32,768 bits. The message block consists of message numbers 0 through N−1. For convenience, FIG. 2 shows a diagramatic illustration of the messages appearing on the network over a selected period of time with the time duration of each message being represented by the length of the associated block. Each message is labelled with the message number.

In general each message follows the same predetermined format. Illustrative details of the format are shown for message 5 in FIG. 2, the other messages are arranged in the same format. Reading from left to right, each message starts with a 16-bit guard word which consists of a fixed pattern of bits that is used to insure separation between successive messages. Following the guard word is a 16-bit message synchronization code word which is used by the NIUs for synchronization purposes in a conventional manner. The next two 16-bit words are the destination subscriber address and originating subscriber address, respectively, for the associated message. In special circumstances, for example a message used to transmit pace number information, the destination address characters may be replaced by other information, such as message number information. The next 16-bit word is the message type code which indicates whether the message is a control or data message. A message length word follows the type code. The length word is used to inform the NIUs of the length of the message in order that they may begin preparation for transmission of a succeeding message before detecting the end of the preceeding message in order to reduce network delays. Next follows a cyclic redundancy code which is a well-known and conventional error detecting code used to detect and correct transmission errors in the preceeding words (the so-called "header" portion of the message). Following the header information, is the data or control field which can vary between 96 bits and 32,624 bits in length the size of these fields is programmable in the embodiment described and can be changed to suit the requirements of the user.

The contents of the data or control portion of the message vary depending on the type and purpose of the message. The different types of incoming messages are shown in FIGS. 3(A-K) with Table II defining the mnemonic codes used in FIGS. 3(A-K). Any message with a general or "broadcast" destination address and all messages with the destination address of a particular NIU are processed by that NIU. In some cases, especially if the associated subscriber device is performing a "network monitor" function (described in detail below), the NIU processes all incoming messages and passes them to its associated subscriber regardless of the message type or the actual destination address.

The last part of a message consists of a second cyclic redundancy code followed by another guard word. The second cyclic redundancy code word is used in a well-known fashion to check for transmission errors in the data portion of the message. The second guard word insures separation of the message from the immediately following message.

More particularly, the block synchronization, network mode, retransmission parameter and pacer assignment messages shown in FIGS. 3A, 3B, 3C and 3D, respectively, are always broadcast to all NIUs on the network. The remaining message types, viz. test, status request, status response, assignment change request, reassignment, data and data flow control shown in FIGS. 3E, 3F, 3G, 3H, 3I, 3J and 3K, respectively, are addressed to a specific NIU and only that NIU processes such messages and passes them to its associated subscriber.

TABLE II

| Mnemonic codes used in FIG. 3 | |
| --- | --- |
| G = | GUARD BITS |
| MS = | MESSAGE SYNCHRONIZATION CODE |
| DA = | DESTINATION ADDRESS |
| OA = | ORIGINATOR ADDRESS |
| MT = | MESSAGE TYPE |
| ML = | MESSAGE LENGTH |
| CRC = | CYCLIC REDUNDANCY CODE |
| MN = | MESSAGE NUMBER |
| NM = | NETWORK MODE |
| B1 = | LENGTH OF SHORTEST MESSAGE ALLOWED |
| B2 = | LENGTH OF LONGEST MESSAGE ALLOWED |
| BMN = | FIRST MESSAGE NUMBER RESERVED FOR BLOCK SYNCHRONIZATION MESSAGES |
| BSP = | INTER BLOCK SYNCHRONIZATION MESSAGE SPACING PARAMETER |
| RTP = | RETRANSMISSION PARAMETER |
| PA = | ADDRESS OF NIU ASSIGNED THE PACER FUNCTION |
| AMN = | FIRST MESSAGE NUMBER OF TRANSMIT ASSIGNMENT |
| ASP = | SPACING PARAMETER FOR TRANSMIT ASSIGNMENT |
| AAT = | ASSIGNED ASSIGNMENT TYPE (DEDICATED OR CONTENTION) |
| RAT = | REQUESTED ASSIGNMENT TYPE |
| RSP = | REQUESTED SPACING PARAMETER |
| FC = | FLOW CONTROL BITS |

The operation of the NIUs varies depending on the type of message received and the actual data contained in the message. Specifically, the block synchronization message is used, in accordance with the invention, to perform the pacing function. On receipt of a block synchronization message (FIG. 3A), each NIU compares an internal message number counter with the message number in the received block synchronization message. If there is a match this fact is recorded. If two out of sixteen consecutive comparisons result in mismatches, the NIU recognizes a loss of block synchronization and disables all further transmissions at the end of any ongoing transmission until block synchronization is re-established. Included in the block synchronization message are the most current values for network mode, shortest and longest allowable message lengths, and the first message number and the spacing parameter for block synchronization messages. Each NIU updates these parameters in its internal memory while establishing block synchronization.

The network pacer NIU also receives and monitors the block synchronization message which it has generated and compares the message number in its own message to its internal message counter. On loss of block synchronization while performing the pacer function, an NIU ceases to be the network pacer.

The network mode message (FIG. 3B) is used to initially set up or change the network's operational parameters as stored in the internal memory of each NIU on the network. This message is generated by a central network monitor unit (NMU) (described in detail later) and acknowledged by the NIU which is performing the pacer function at that time.

The retransmission parameter message (FIG. 3C) is used by the NMU to update the retransmission parameter used by each NIU on the network (described in detail below).

The pacer assignment message (FIG. 3D) assigns the pacer function to a specific NIU. It is generated by the NMU and is acknowledged by both the present pacer NIU and the new NIU which is being assigned the pacer function. The NIU which is being assigned the pacer function actually takes over the pacer function only after these acknowledgements are generated on the network.

When an NIU receives a test message (FIG. 3E), it transmits the same test data back to the NIU that sent the message. On receiving the retransmitted test message "echo", the originating NIU passes the received message to its associated subscriber that initiated the loop test.

An incoming status request message (FIG. 3F) causes an NIU to transmit data concerning its internal status to the requesting address in a status response message (FIG. 3G).

The message number assignment request message (FIG. 3H) and the message number reassignment (FIG. 3I) message are used by the NIUs, respectively, to request and receive changes in the message numbers assigned to them for message transmission. A request message is addressed to an NIU and associated subscriber device that is authorized to assign message numbers. That NIU returns a reassignment message to the requesting NIU which causes that NIU to change its internally stored data (the first message number and spacing parameter) which it uses to determine its transmission opportunities.

Data messages (FIG. 3J) and data flow control messages (FIG. 3K) are passed by the receiving NIU to the appropriate associated subscriber. Data flow control messages are used by the subscribers to control the flow of data between the subscriber devices on the network.

An illustrative embodiment of a NIU is shown in block diagram form in FIG. 4. Only one NIU 20 is shown in detail for clarity, other NIUs in the present embodiment are substantially similar to NIU 20 and thus are not described in detail. NIU 20 comprises media access unit 28, network processor 30 and subscriber interface unit 32 and, as previously described couples subscriber devices, such as device 14 to network buses 10 and 12.

Media access unit 28 is a well-known device which converts the signals on buses 10 and 12 into signal formats which can be used by network processor 30. The actual circuitry of the unit depends on the type of medium used for buses 10 and 12. Different media will require different circuitry to provide the proper interface, however, all such interface circuitry is well-known and conventional. In the case where buses 10 and 12 are CATV cables, unit 28 may illustrative be a radio-frequency modem. Such modems are well-known and consist of a modulator and demodulator section. A modem suitable for use with the illustrative embodiment can be obtained from Interactive Systems Corporation, a subsidiary of 3M Corporation.

The modulator portion of the modem converts a serial data stream generated by network processor 30 into a radio-frequency signal suitable for transmission over bus 10. In particular, the modem modulator converts a serial data stream produced by processor 30 on the TMT data line under control of a clock signal generated on the TMT clock lead when the transmit enable line is asserted by processor 30.

The demodulator portion of the radio-frequency modem transforms the RF signal received from outbound bus 12 into digital signals which are provided to processor 30. Specifically, digital data signals and a derived clock signal are provided to processor 30 on the RCV data line and the RCV clock line, respectively. In addition, the modem asserts the RCV enable line to indicate the presence of incoming information.

Subscriber interface 32 receives and converts the signals generated by processor 30 into signals usable by the associated subscriber devices. Interface 32 also converts signals produced by the subscriber devices into a format usable by processor 30. In order to allow processor 30 to operate with a variety of different subscriber devices, interface 32 is preferably a programmed microcomputer which can be quickly and easily programmed to perform the necessary conversions and formatting. A microcomputer suitable for use with the illustrative embodiment is a Motorola MC 68000 microprocessor with associated memory and control chips. Such a microcomputer may be programmed in conventional well-known ways to perform the interface function between the signal lines used by processor 30 and up to eight RS232C standard serial lines and one IEEE 488 standard parallel line which can be connected to the subscriber units.

Network processor 30, is shown in detailed block schematic form in FIG. 5. It processes the incoming and outgoing message information and controls the flow of data between media access unit 28 and subscriber interface 32. Network processor 30 consists of a high speed microprocessor 31 (described below); receive and transmit logic, 54 and 52; random access memories 50 and 48; direct memory access controller 46; timing generator 62; and pseudo-random number generator 64. The elements of the network processor are connected together by processor bus 44, input bus 60 and output bus 56. Processor bus 44 is, in turn, connected to input bus 60 and output bus 56 via bus interfaces 66 and 68, respectively.

Microprocessor 31 consists of well-known circuitry and comprises a central processing unit (CPU) 40, control store 38, pipeline 42, program sequencer 36 and programmable read-only memory 34. Microprocessor 31 regulates and controls the operation of network processor 30 under control of program steps stored in control store 38 which is a programmable read-only memory. In order to reduce the time required to fetch the instruction steps from store 38, microprocessor 31 is provided with pipeline register 42 which is controlled by circuitry (not shown) to fetch and store the next instruction step following the step which is being executed. In order to provide for branching instructions, the actual program step sequence is controlled by program sequencer 36 which determines the actual address of the next instruction to be executed by CPU 40.

Programmable read-only memory 34 is the non-volatile memory which, under control of CPU 40, stores parameters necessary for the operation of the NIU, such as the address of the NIU, the starting message number and spacing parameter, etc., used by the NIU to coordinate transmission on the data network in accordance with the invention. In the illustrative embodiment, CPU 40 is a sixteen-bit processor which may comprise four model 2901 chips with one model 2902 carry-look-ahead integrated circuits commercially sold by Advanced Micro Devices, Inc. Sequencer circuit 36 may illustratively be a model 2909 sequence chips also sold by Advanced Micro Devices. In other embodiments, a microprocessor, such as the model MC68000 manufactured by Motorola Semiconductor products, Inc. and suitably programmed may be used for CPU 40. Gate arrays or special Very Large Scale Integrated Circuits may also perform the CPU 40 functions.

Microprocessor 31 is connected with media access unit 28 through transmit and receive logic 52 and 54. Receive logic 54, transmit logic 52, and direct memory access controller 46 consist of standard, well-known digital logic circuits which convert the signals produced by unit 28 into a form suitable for use with microprocessor 31. Specifically, logic 54 receives and buffers the message information received from unit 28 in the form of a serial bit stream, converts the stream into sixteen-bit parallel words, stores the sixteen-bit words in input memory 50, and checks the validity of the two error correcting codes (cyclic redundancy codes) in the received message to insure that no errors have been introduced in the header or data portions of the message during transmission.

Transmit logic 52 performs the reverse function to the receive logic. In particular, transmit logic 52 reads sixteen-bit parallel data words from output memory 48, converts the words into a serial bit stream which is provided to media access unit 28.

Direct memory access controller 46 is a well-known logic circuit device which controls the flow of data between memories 48 and 50 and subscriber interface 32. Under control of controller 46 information is fetched from memory 50 and forwarded to subscriber interface 32. Similarly outgoing data from the subscriber is provided to interface 32 which then, under control of controller 46 stores the data in memory 48.

Timing signals which coordinate the execution of programs by microprocessor 31 and time the flow of data between the media access unit, network controller and subscriber interface are generated by timing generator 62 which produces two clock signals, one for the execution of programs on CPU 40 and another for data reception and transmission on the network. Generator 62 also generates signals to indicate the occurrence of different "events", such as the end of the reception of header information or start of a microprocessor instruction fetch from memory.

Pseudo-random number generator is a free-counting sixteen-bit counter whose value can be read by the CPU 40 and is used as will be described hereinafter to resolve retransmission sequences in contention situations.

Bus interfaces 66 and 68 are data flow control gates which permit CPU 40 to read or write directly into memories 50 and 48, respectively.

The operations performed by each NIU during transmission on the network will now be described in detail.

In general to begin transmission an NIU first operationally checks and then enables its receiving apparatus, then performs a fixed set of steps to become synchronized and finally begins its "pacing" operation to enable transmission.

In order to transmit and receive information from the network, the NIU must first become synchronized to the flow of messages on the network. In particular a synchronization operation is performed when the NIU is started, after a manual reset operation or when an NIU loses synchronization for some reason. Before the synchronization process, the NIU performs a variety of self-testing functions to verify to itself that it is functioning properly. These functions include the testing of all the elements of processor 30 for correct execution of program instructions and the checking of the interface with the subscriber interface 32.

If the NIU successfully passes the self-diagnosis tests, it proceeds with message processing. If unsuccessful, it attempts to pass the test a second time and a second failure causes the NIU 40 to reset.

After successfully passing a self-diagnosis test or after a manual reset, CPU 40 enables receive logic 54 and monitors the network to detect some activity. If there is some activity on the network, CPU 40 proceeds to test if receive logic 54 is able to track the beginning and end of messages on the network. Upon being enabled, receive logic 54 operates, as previously described, to convert the serial bit stream received from media access unit 28 into 16-bit parallel words. Logic 54 then stores each 16-bit word in memory 50. In order to insure that a proper message has been received, however, logic 54 stores the received data only if a valid message synchronization code is received within 32-bit times following the assertion of the receive enable signal, by unit 28. If no message synchronization code is received within 32-bit times after an assertion of the receive enable or if the cyclic redundancy code for the header information indicates an error, then a message error is assumed and the data is not stored. During message reception, receive logic 54 also supplies to the processor 40 the result of the error correcting code checks for the header and the whole message.

Receive logic 54 also advantageously uses the message length information contained in the received message to predict the start of the next succeeding message and sets up a 32-bit "window" within which a valid start of message is expected. In particular, the length of a message is the length as indicated by the message length code in its header if: (a) a valid start of message has been received; (b) the error correcting code for the header indicates the header information has been correctly received and (c) the length of the message as indicated by the received message code is greater than the shortest message length (B1) allowed on the network (if not, the message length will be assumed to be the shortest message length). If the actual start of the next succeeding message occurs outside the 32-bit calculated "window", an error is indicated to CPU 40. If receive logic 54 correctly predicts the start of message for three consecutive, non-null messages then CPU 40 declares message synchronization and starts processing incoming messages.

After achieving message synchronization and assuming the presence of another pacer NIU in the system, block synchronization is established. In order to block synchronize, the NIU receives and processes a block synchronization message transmitted by the network pacer and, using the parameter information in the block synchronization message, the NIU initializes its internal message number counter and stores the network parameters in the block synchronization message in its internal memory 34.

The NIU then begins monitoring the start and end of messages on the network and updating its internal message number counter accordingly. Each time a block synchronization message is received it compares the message number in its internal counter with the value received from block synchronization message seeking a match. When these comparisons have resulted in matches for two consecutive block synchronization messages, CPU 40 declares that the NIU is block synchronized.

If, on reset, after enabling receive logic 54, CPU 40 detects no activity on the network for a duration of several blocks, it assumes that it is the first active NIU on the network, declares message synchronization and attempts to become the network pacer by transmitting a block synchronization message using network parameters stored in its internal read-only memory. It then receives and checks its own block synchronization message. If the message is received without error, it becomes the pacer and enables all message transmission following a successful loop test.

During operation, if CPU 40 fails to receive at least one block synchronization message in any block, it declares loss of block synchronization and ceases all further transmission for a predetermined duration which is a function of the NIU address. If during this period, the processor 40 receives block synchronization messages, it restarts the synchronization process and enables transmission after successful block synchronization. However, if no block synchronization message is received during the pause interval, the NIU attempts to become the pacer by transmitting a block synchronization message as described before. If this block synchronization message is the first error-free block synchronization message on the network, then NIU 20 becomes the network pacer. If the message has an error on reception, the CPU 40 retransmits at the next message number for block synchronization messages. During the pacer establishment process, all NIUs synchronize themselves to the block synchronization messages from the NIU that succeeds in transmitting the first error free block synchronization message. Any other block synchronization message which may appear on the network due to delay between a NIUs receive and transmit timings are ignored.

Following block synchronization, the NIU then begins its pacing operation to determine the exact times at which it is allowed to transmit. In particular, the NIU must determine if a transmit opportunity exists. A transmit opportunity exists after the end of transmission of the subscriber with the message number immediately preceeding a number assigned to the NIU. In accordance with the invention, each NIU uses internal information and the message length information stored in each message to predict by calculation when its transmit opportunities will occur and begin transmission at an appropriate time to minimize the effect of transmission delays on the network.

In order to determine the times at which it will be allowed to transmit each NIU paces the operation of the network by keeping an internal count (periodically compared to the pace number) of messages which have been transmitted on the network. The availability of a transmit opportunity may also depend on the amount of traffic on the network. The procedure may vary between a light traffic load and a heavy traffic load. The existence of light or heavy traffic loads is determined by an NIU at any particular time by monitoring the fraction of the message numbers in the previous and the current blocks that actually contained a non-null message. If this fraction is less than a predetermined value then the network traffic is considered light, if not, it is considered heavy.

During heavy traffic load situations, an NIU determines whether it has a transmit opportunity for a particular message number by logically combining that message number with its internally stored message number assignment parameters (the first message number and the spacing parameter). Specifically, a transmit opportunity is calculated by AND-ing the message number with the spacing parameter assigned to the NIU and then subtracting that NIU's first message number. Only if the result is zero (MN·ASP−AMN=0) does the NIU have an opportunity to transmit in that message number.

Under light network loading, NIU 20 may assume transmit opportunity availability in every message number.

The NIU next determines its "network delay parameter" which is used in the calculation of the start of its transmitted message during normal transmission as will be describer in detail below. The network delay parameter differs for each NIU and is dependent on the distance of the NIU from the head end of the network for topology with the one-way links. The delay parameter is determined by each NIU during its initial synchronization process by sending out a short (header only) self-addressed loop test message in a message number reserved for this purpose and counting the elapsed bit times between the start of transmission and the start of error-free reception of the same message.

In each NIU, CPU 40 then tests the transmission circuitry by performing a loop-test by transmitting a test message to itself. The received test message is compared to the original transmitted message. If the test message is received without error, transmission is enabled. An error in the received test message causes CPU 40 to try for a successful loop test for a maximum of sixteen times. A failure to complete a loop test within sixteen tries causes CPU 40 to disable all transmissions and declaration of an irrecoverable transmit error which requires operator attention.

Assuming that all of the above synchronization operations have taken place properly, the NIU may begin transmission of actual data on the network. Referring to FIG. 4, during a transmission operation, after an outgoing message has been stored in output memory 48, via output bus 58, by direct memory access controller 46 as previously described, CPU 40 enables the transmit logic 52 to prepare for a message transmission on the network. In particular, in accordance with the invention, transmit logic 52 is enabled during the transmission time of another subscriber that has been assigned a message number which is two message numbers prior to the message number assigned to the subsciber which desires to transmit a message. Once enabled by the processor 40, the transmit logic 52 reads data from the output memory 48, converts into a serial bit stream as previously described. The converted information is not sent to media access unit 28 until a predetermined time before the calculated end of the message transmitted by the subscriber assigned the immediately preceeding message number.

In accordance with the invention, the actual time at which transmit logic 52 starts shifting out the outgoing message for transmission on the network is calculated by transmit logic 52 rather than determined by actually monitoring for the end of the preceeding message. Since the end of the preceeding message is calculated rather than measured, network delay characteristics can be taken into account. Specifically, the time at which transmit logic 52 begins shifting the outgoing message is calculated by taking the message length for the preceding message (as determined by the receive logic 54 from the message length code of the preceeding message) and subtracting elapsed bit-times since the start of the preceding message (also determined by receive logic 54 as described above). Shifting begins when the difference equals the network delay parameter. For a base band or a two-way cabled system the delay will be almost zero bit-times.

A subscriber which does not have a message to transmit during a dedicated transmission opportunity may either transmit a dummy message or nothing. A subscriber which is assigned a contention message number and does not have a message to transmit, transmits nothing. A pause of certain minimum duration from the end of the previous message is considered as a null message (a message number with no transmission) which causes all subscribers on the network to advance their internal message number count by one.

A subscriber while transmitting in its assigned message number receives its own message and checks for errors. Errors in a message may occur due to random noise, equipment failure or due to contention. On detection of an error, the subscriber terminates its transmission. It then retransmits the message at its next transmission opportunity, if that opportunity is dedicated to it. For a contention message number assignment, to permit contention resolution on retransmission, the subscriber retransmits at its next transmission opportunity only if an internally generated random number is less than a predetermined, assigned parameter called the retransmission parameter.

More specifically, transmission by an NIU is controlled by setting and resetting "flags" in the transmit logic circuitry. If an NIU desires to transmit a message on the network and a transmit opportunity is available to the NIU (and no message is waiting for retransmission), a "flag" is set within transmit logic 52. This flag is reset by the transmit logic 52 at the start of transmission of the message.

During transmission processing, after the processing at the beginning of each message, CPU 40 stays idle until interrupted by receive logic 54 on receipt of the header of an incoming message. If the received message is its own transmitted message and the received error checking information indicates that the received header information is correct, CPU 40 releases output memory 48 for the next outgoing message. If the error correcting information indicates an error, transmit logic 52 terminates its transmission after a message equal in length to the shortest allowed message has been transmitted, and CPU 40 sets a retransmit "flag" (to prevent confusion, a block synchronization message sent by an NIU while it is performing the pacer function, which is received with an error, is not set up for retransmission). When CPU 40 is interrupted on receipt of the header of a message destined for the NIU itself, CPU 40 performs functions required by the type of the incoming message.

If a message is waiting for retransmission a "flag" has been set on failure of the initial transmission as described above. The actual retransmission operation depends on whether the next message which has been assigned to the transmitting NIU is a dedicated or a contention message number. If a transmit opportunity is available, a message is waiting for retransmission and the NIU has a dedicated message number assignment, the retransmit "flag" is reset, the transmit "flag" is set in transmit logic 52 and the message is retransmitted.

On availability of a contention transmit opportunity with a message awaiting retransmission, CPU 40 reads a pseudo-random number from the pseudo-random number generator 64. If the number read is less than the retransmission parameter stored in read only memory 34, the retransmit "flag" is reset, the transmit "flag" is set and the message retransmitted; if not retransmission is delayed at least until the next transmit opportunity. Every time an NIU fails to successfully retransmit a message on a contention assignment, it divides by two its retransmission parameter. The probability of re-trial during a contention transmit opportunity is thereby reduced. As soon as the NIU succeeds in retransmitting its message in a contention assignment, it resets its retransmission parameter to the initial value stored in read-only memory 34.

If an NIU is the network pacer, it determines if a block synchronization message is to be transmitted in the same manner as with normal transmissions described above. In particular the NIU enables transmission during the transmission of the subscriber assigned a message number which is two message numbers preceeding the next message number assigned to the NIU. The NIU then sets up the block synchronization message in its output memory 48 and sets the transmit "flag" in transmit logic 52. The process by which CPU 40 determines if a block synchronization message is to be transmitted is the same as that for the determination of transmit opportunity described earlier except that the block transmission parameters are used instead on the NIUs internal message assignment parameters (MN·BSP − BMN = 0).

After completing transmit opportunity processing, CPU 40 determines if a start of message was received outside the window determined by the receive logic 54 as previously described. If two such invalid indications are received within a set of five consecutive messages, the processor 40 declares loss of synchronization and disables its transmit logic 52. With loss of synchronization, the processor 40 initiates the reset and synchronization procedure described above.

FIG. 6 gives the relationship between functions performed by processor 40 and the network timing.

A functional flowchart of the program executed on CPU 40 is given in Table IV. The actual program steps may be coded with any set of micro-instructions designed for bit-slice microprocessors.

TABLE IV

A. RESET PROCEDURE (CALLED BY RESET AT ANY TIME)
1. PERFORM SELF-DIAGNOSIS TEST
2. IF TEST PASSED, THEN STEP 3, ELSE STEP 1
3. RESET TRANSMIT FLAGS, SET RESET BIT = 1
4. READ STATUS OF SUBSCRIBER INTERFACE
5. SET UP NETWORK PARAMETERS
6. CHECK MESSAGE ACTIVITY ON NETWORK
7. IF NO MESSAGES ON NETWORK (MSG ACT = 0), THEN STEP 8, ELSE STEP 14
8. WAIT FOR PREDETERMINED TIME DELAY (DEPENDING ON NIU ADDRESS)
9. CHECK MESSAGE ACTIVITY ON NETWORK
10. IF MSG ACT STILL = 0, THEN STEP 11, ELSE STEP 14
11. DECLARE MESSAGE SYNC. (SET MSG SYNC BIT = 1, DECLARE BLOCK SYNCH (SET BLK SYNC BIT = 1, AND SET PACER SEL = 1
12. SET UP DELAY MESSAGE
13. INDICATE NIU READY FOR OUTPUT DATA (SET DATA OUT RDY = 1)
14. WAIT FOR INTERRUPT AT BEGINNING OF MSG. AND WHEN INTERRUPT OCCURS, FOLLOW NORMAL PROCESSING PROCEDURE B

B. NORMAL PROCESSING PROCEDURE
1. CHECK FOR INTERRUPTS
2. IF AN INTERRUPT OCCURS AT BEGINNING OF MSG THEN STEP 3, ELSE STEP 7
3. CHECK TIMEOUT COUNTER AND PACER DELAY COUNTER
4. IF TIMEOUT COUNTER HAS NOT TIMED OUT (TIME OUT = 0) AND PACER DELAY TIMER HAS TIMED OUT (PACER DELAY TIMER = 0) THEN STEP 5, ELSE STEP 6
5. FOLLOW PACER DELAY PROCEDURE
6. FOLLOW MESSAGE BEGINNING PROCEDURE C
7. IF AN INTERRUPT OCCURS DURING MSG SYNC PROCESSING THEN STEP 8, ELSE STEP 9
8. FOLLOW MESSAGE SYNC PROCEDURE
9. IF INTERRUPT OCCURS AFTER RECEIPT OF HEADER THEN FOLOW INPUT MSG PROCEDURE

C. MESSAGE BEGINNING PROCEDURE
1. PERFORM SELF-DIAGNOSIS TEST
2. IF UNSUCCESSFUL IN TWO ATTEMPTS THEN STEP 3, ELSE STEP 4
3. FOLLOW RESET PROCEDURE A
4. CHECK BLOCK SYNCH BIT, BLOCK SYNCH FIRST BIT AND NO PACER BIT
5. IF NIU BLOCK SYNCHED (BLK SYNC BIT = 1 OR THIS IS FIRST SYNCH BLOCK (BLK SYNC FIRST BIT = 1) OR NO NETWORK PACER EXISTS (NO PACER BIT = 1) THEN STEP 6, ELSE STEP 17

TABLE IV-continued

6. INCREMENT MESSAGE COUNTER (MSG COUNT = MSG COUNT + 1)
7. CHECK MESSAGE COUNT
8. IF MSG COUNT GREATER THAN TOTAL MSGS PER BLOCK. THEN STEP 9 ELSE STEP 18
9. SET MESSAGE COUNT = 0
10. SET LAST BLOCK ACT = CURRENT BLOCK ACT
11. SET CUR BLK ACT = 0
12. CHECK BLOCK SYNC MESSAGE COUNTER
13. IF BLOCK SYNC MESSAGE COUNT GREATER THAN 0 THEN STEP 14 ELSE STEP 15
14. SET BLK SYNC MSG COUNT = 0
15. SET BLK SYNC BIT = 0. NO PACER BIT = 1,
16. FOLLOW PACER DELAY PROCEDURE
17. WAIT FOR INTERRUPT
18. CHECK BLOCK SYNCH BIT
19. IF BLK SYNC BIT = 1 THEN STEP 20. ELSE STEP 25
20. LOGICALLY "AND" MESSAGE COUNT AND BLOCK SYNCH SPACING PARAMETER AND SUBTRACT BLOCK SYNCH MESSAGE NUMBER
21. IF ((MSG CT . BLK SYNC SP PAR) - BLK SYNC MSG NUM) =0 THEN STEP 22 ELSE STEP 35
22. CHECK PACER SEL BIT AND PACER IDENTIFICATION ADDRESS
23. IF (PACER SEL BIT = 1) AND (PACER ADDR = NIU ADDR) THEN STEP 24, ELSE STEP 35
24. SET TRANSMIT BUFFER = BLK SYNC MSG, SET TRANSMIT FLAG = 1
25. CHECK TRANSMIT BLOCK SYNCH BIT AND RETRANSMIT FLAG
26. IF TMT BLK SYNC BIT = 1 AND RETRANSMIT FLAG = 0 THEN STEP 27. ELSE STEP 29
27. SET TMT BUFFER = BLK SYNC MSG, SET TRANSMIT FLAG = 1
28. PROCEED TO STEP 34
29. IF (TMT BLK SYNC BIT = 1) AND (RETMT FLAG = 1) THEN STEP 30, ELSE STEP 34
30. CHECK PSEUDO-RANDOM NUMBER GENERATOR
31. IF PSEUDO-RANDOM NUM LESS THAN RETRANSMIT PARAMETER, THEN STEP 32, ELSE STEP 34
32. SET TMT BUFFER = BLK SYNC MSG
33. SET TRANSMIT FLAG = 1
34. WAIT FOR INTERRUPT
35. LOGICALLY "AND" MSG COUNT AND TRANSMIT SPACING PARAMETER AND SUBTRACT TRANSMIT MESSAGE NUMBER
36. IF ((MSG CT . TMT SP PAR) - TMT MSG NUM) =0 OR ((2*LAST BLK ACT LESS THAN NUMBER OF MESSAGES PER BLK) AND (2*CUR BLK ACT LESS THAN MSG CT) THEN STEP 37, ELSE STEP
37. CHECK RETRANSMIT FLAG
38. IF RETMT FLAG = 1 THEN STEP 39, ELSE STEP 46
39. CHECK TRANSMISSION ASSIGNMENT TYPE
40. IF TMT ASSIGN TYPE = "CONTENTION" THEN
41. CHECK PSEUDO-RANDOM NUMBER GENERATOR
42. IF PSEUDO RANDOM NUM LESS THAN RETMT PARAMETER THEN STEP 43, ELSE STEP 49
43. SET RETMT FLAG = 0, TMT FLAG = 1
44. PROCEED TO STEP 49
45. SET RETMT FLAG=0, TMT FLAG = 1 PROCEED TO STEP 49
46. CHECK DATA OUT READY BIT
47. IF DATA OUT RDY BIT = 1 THEN STEP 48, ELSE STEP 49
48. SET TMT FLAG = 1
49. WAIT FOR INTERRUPT

C. PACER DELAY PROCEDURE

1. CHECK TIMEOUT BIT
2. IF TIMEOUT BIT = 0 THEN STEP 3, ELSE STEP 5
3. SET TIMEOUT BIT = 1
4. SET UP TIMER TO PRODUCE INTERRUPT AFTER PREDETERMINED DELAY (DEPENDING ON NIU ADDR)
5. CHECK BLK SYNC BIT AND CURRENT BLK ACT BIT
6. IF (BLK SYNC BIT = 0) AND (CUR BLK ACT BIT = 0) THEN STEP 7, ELSE STEP 9
7. SET TMT BLK SYNC BIT = 1
8. SET TIME OUT BIT = 0
9. WAIT FOR INTERRUPT

D. MESSAGE SYNC PROCEDURE

1. COMPARE MESSAGE SYNCH INTERRUPT AGAINST TIMING WINDOW (MSG SYNCH OUT OF WINDOW BIT)
2. IF MSG SYNC OUT OF WINDOW BIT = 1 THEN STEP 3, ELSE STEP 8
3. SET MSG SYNC FIRST BIT = 0
4. CHECK MSG SYNC ERROR BIT
5. IF MSG SYNC ERROR BIT = 1 THEN STEP 6, ELSE STEP 7
6. SET MSG SYNC BIT = 0, BLK SYNC BIT = 0 PACER SEL = 0 AND MSG SYNC CT = 0
7. SET MSG SYNCH ERROR BIT = 1, MSG SYNC CT = 1
8. CHECK MESSAGE SYNCH ERROR BIT
9. IF MSG SYNC ERROR BIT = 1 THEN STEP 10, ELSE STEP 19
10. INCREMENT MSG SYNC COUNTER (MSG SYNC CT = MSG SYNC CT

TABLE IV-continued

+ 1)
11. CHECK MSG SYNC CTR
12. IF MSG SYNC CT = 4 THEN STEP 13, ELSE STEP 14
13. SET MSG SYNC CT = 0, MSG SYNC ERROR BIT = 0 PROCEED TO STEP 19
14. IF MSG SYNC = 0 THEN STEP 15, ELSE STEP 19
15. CHECK MESSAGE SYNC FIRST BIT
16. IF MSG SYNC FIRST = 1 THEN STEP 17, ELSE STEP 18
17. SET MSG SYNC BIT = 1 MSG SYNC FIRST BIT = 0 PROCEED TO STEP 19
18. SET MSG SYNC FIRST BIT = 1
19. WAIT FOR INTERRUPT

E. INPUT MSG PROCEDURE

1. CHECK TMT FLAG
2. IF TMT FLAG = 1 THEN STEP 3, ELSE STEP 8
3. CHECK RESET FLAG AND CRC ERROR FLAG
4. IF RESET FLAG = 1 AND CRC ERROR FLAG = 0 THEN STEP 5, ELSE STEP 6
5. SET RESET FLAG = 0, SET DELAY BIT = 1 PROCEED TO STEP 8
6. IF RESET FLAG = 1 AND CRC ERROR FLAG = 1 THEN STEP 7, ELSE STEP 8
7. SET RETMT FLAG = 1, SET TMT FLAG = 0
8. SET CUR BLK ACT = CUR BLK ACT + 1
9. CHECK MESSAGE SYNCH BIT
10. IF MSG SYNC BIT = 1 THEN STEP 11
11. FOLLOW MSG TYPE PROCEDURE

F. BLOCK SYNC PROCEDURE

1. CHECK NO PACER BIT
2. IF NO PACER BIT = 1 THEN STEP 3, ELSE STEP 4
3. FOLLOW PACER SELECT PROCEDURE
4. CHECK BLOCK SYNC BIT
5. IF BLK SYNC BIT = 1 THEN
6. COMPARE MSG COUNT AND MSG NUMBER
7. IF MSG CT NOT EQUAL TO MSG NUM THEN STEP 8, ELSE STEP 12
8. CHECK BLK SYNC ERROR BIT
9. IF BLK SYNC ERROR BIT = 1 THEN STEP 10, ELSE STEP 11
10. SET BLK SYNC BIT = 0, PACER SEL = 0, BLK SYNC ERROR BIT = 0 and BLK SYNC CT = 0
11. SET BLK SYNC ERROR BIT = 1, BLK SYNC CT = 1
12. CHECK BLK SYNC ERROR BIT
13. IF BLK SYNC ERROR BIT = 1 THEN STEP 14, ELSE STEP 23
14. SET BLK SYNC CT = BLK SYNC CT + 1
15. CHECK BLK SYNC CT
16. IF BLK SYNC CT = 4 THEN STEP 17, ELSE STEP 19
17. SET BLK SYNC ERROR BIT = 0
18. SET BLK SYNC CT = 0
19. WAIT FOR END OF MESSAGE
20. CHECK MSG ERROR BIT AND NETWORK CHANGE PARAMETER BIT
21. IF MSG ERROR BIT = 0 AND NET PAR CHANGE BIT = 1 THEN STEP 22, ELSE STEP
22. UPDATE NET PARAMETERS, PASS MSG TO SUBS INT
23. IF BLK SYNC FIRST BIT= 1 THEN STEP 24, ELSE STEP 33
24. COMPARE MSG COUNT AND MESSAGE NUMBER
25. IF MSG CTR = MSG NUM THEN STEP 26, ELSE STEP 31
26. SET BLK SYNC BIT = 1, BLK SYNC FIRST BIT = 0
27. CHECK RESET BIT
28. IF RESET BIT = 1 THEN
29. SET UP DELAY MSG
30. SET DATA OUT RDY BIT = 1
31. SET BLK SYNC FIRST BIT = 0
33. WAIT FOR END OF MSG
33. CHECK MSG ERROR BIT
34. IF MSG ERROR BIT = 0 THEN
35. SET MSG CT = MSG NUM
36. SET BLK SYNC FIRST BIT = 1
37. UPDATE NET PARAMETERS, PASS MSG TO SUBS INT
38. WAIT FOR INTERRUPT

G. PACER SELECT PROCEDURE

1. WAIT FOR END OF MSG
2. CHECK MSG ERROR BIT
3. IF MSG ERROR BIT = 0 THEN
4. SET PACER ADDRESS = ORIGINATOR ADDRESS
5. IF PACER ADDRESS = NIU ADDRESS THEN
6. SET PACER SEL = 1
7. SET BLK SYNC BIT = 1
8. ELSE SET MSG CT = MSG NUM
9. SET BLK SYNC FIRST BIT = 1, NO PACER BIT = 0.
10. TMT BLK SYNC BIT = 0, RETMT FLAG = 0
11. WAIT FOR INTERRUPT

H. SET MODE PROCEDURE

TABLE IV-continued

1. CHECK PACER SEL
2. IF PACER SEL = 1 THEN
3. WAIT FOR END OF MSG
4. IF MSG ERROR = 0 THEN
5. UPDATE NET PARAMETERS
6. SET NET PAR CHANGE BIT = 1
7. SET UP ECHO MSG
8. SET DATA OUT RDY BIT = 1
9. WAIT FOR INTERRUPT

I. RETRANSMIT PARAMETER CHANGE PROCEDURE
1. WAIT FOR END OF MSG
2. CHECK MSG ERROR BIT AND COMPARE DESTINATION ADDR TO NIU ADDR.
3. IF MSG ERROR BIT = 0 AND DEST ADDR = NIU ADDR THEN
4. SET RETRANSMIT PARAMETER = RTP
5. CHECK PACER SEL
6. IF PACER SEL = 1 THEN
7. SET UP ECHO MSG
8. SET DATA OUT RDY BIT = 1
9. WAIT FOR INTERRUPT

J. PACER ASSIGNMENT PROCEDURE
1. CHECK PA ACK BIT AND PACER SEL
2. IF (PA ACK = 0) AND (PACER SEL = 1) THEN
3. SET UP ECHO MSG WITH ORIG ADDR = NIU ADDR
4. SET DATA OUT RDY BIT = 1
5. SET PA ACK BIT = 1
6. IF (PA ACK = 1) AND (PACER SEL = 1) THEN
7. IF PAC ADDR NE NIU ADDR THEN
8. PACER SEL = 0, PA ACK = 0
9. IF (PAC ADDR = NIU ADDR) AND (ORIG ADDR = PACER) THEN
10. PACER SEL = 1
11. PACER = NIU ADDR
12. NET PAR CHANGE = 1
13. PASS MSG TO NET MON UNIT SUBS INT
14. WAIT FOR INTERRUPT

K. LOOP TEST, STAT RES, MSG NUM REQ, DATA, DATA FL CTR PROCEDURE
1. IF DEST ADDR = NIU ADDR THEN
2. PASS MSG TO SUBS INT
3. WAIT FOR INTERRUPT

L. STATUS REQUEST PROCEDURE
1. IF DEST ADDR = NIU ADDR THEN
2. PASS MSG TO SUBS INT
3. SET-UP NP STATUS
4. DATA OUT RDY = 1
5. WAIT FOR INTERRUPT

M. REASSIGNMENT PROCEDURE
1. IF DEST ADDR = NIU ADDR THEN
2. PASS MSG TO SUBS INT
3. TMT MSG NUM = AMN
4. TMT SP PAR = ASP
5. TMT ASSIGN TYPE = AAT
6. WAIT FOR INTERRUPT

Having described an embodiment of the present invention, the following is a detailed explanation of how use of the message length field reduces the effect of transmission delays. In particular, use of the message length parameter allows inter-message pauses to be independent of the distance between NIUs in network topologies that use two one-way links.

FIG. 7(A) shows three NIUs, 20, 22 and 24, arranged on a typical network. Assume, for the purposes of illustration, that NIU 20 and NIU 24 are located on the network such that the time (in seconds) that a signal requires to travel along bus 10 from NIU 20 and NIU 24 to head-end 26 and along bus 12 from head-end 26 to NIU 20 and NIU 24 is $t_{20}$ and $t_{24}$, respectively. Now consider the flow of messages at the head-end 26 if a message from NIU 24 follows one from NIU 20 and time zero is considered to be the arrival of NIU 20's message at the head-end 26. Without the message length field, NIU 24 can transmit only after the end of NIU 20's message arrives at the input of NIU 24. This will occur $t_{24}$ seconds after the end of NIU 20 message flows by the head-end 26. If NIU 24 starts its message at this point in time, it will be another $t_{24}$ seconds before the start of NIU 24's message arrives at the head-end 26. Therefore the inter-message pause will be $2t_{24}$ seconds.

Advantageously, in accordance with the present invention, NIU 24 can internally calculate the length of NIU 20's message from information in the message itself, so it can start its own transmission $2t_{24}$ seconds before the end of NIU 20's message (including a fixed guard period). Therefore, there will be a fixed inter-message pause equal to the guard period. The use of the message length information improves bandwidth utilization in operating environments in which the average transmission delay is significant compared with the average message length. In the present embodiment, NIU 20 determines its transmission delay ($2t_{20}$ seconds) during its reset and synchronization operation by sending a very short, self-addressed test message assuming $t_{20}=0$ seconds. The amount of time between the start of transmission and error-free reception of this message is the value $2t_{20}$.

The use of message length information not only has the above benefits, but when implemented with carrier sensing with collision detection access method, it reduces to about one-third the average time lost due to collision for a two one-way link topology. Consider two NIUs farthest from the head-end 26 on a one-way transmission delay of T seconds as shown in FIG. 7(B). Now, the message from any of one of these NIUs will arrive at its input after 2T seconds during which the other NIU could also start its transmission. The result of the transmission of the second NIU will not appear at the inputs of the two NIUs for another 2T seconds. Therefore, the total time before which collisions could be detected by both NIUs is 4T seconds. However, after collision is detected and the NIUs cease transmission, there will be another 2T seconds of collided message on the network. The net result is that a maximum of 6T seconds is lost to collisions. However, with the the internal calculation of message length, the maximum time lost to collisions is 2T seconds. The average time lost to collisions assuming a uniform distribution of NIUs generating traffic will be 3T and T seconds respectively, without and with the message length improvement.

Briefly, the AMDMA system described here permits variable or fixed message length with dedicated or contention access to the network. Therefore, the performance of the network is dependent on how the network is used, which could be adjusted to the operating environment.

Based only on how the network is used, the same network can operate in six modes, each with optimal performance for a different operating environment (see Table III below).

In its first mode of operation, (Mode A), the present invention is used with variable message length and both dedicated and contention assignment of message numbers. In this mode the network can optimally accommodate high and low duty cycle subscribers having variable message length. Further, different subscribers, depending on their priority and usage, can be allocated varying number of message numbers per block. While high duty cycle subscribers are assigned dedicated message numbers, the low duty cycle subscribers depending on their priority, are assigned one of several sets of contention message numbers. This mode of operation of the present invention is unique in the operating environment it can optimally accommodate.

In its second mode of operation, (Mode B), the present invention is used with variable message length and only dedicated message number assignment. In this mode the network can optimally accommodate high duty cycle subscribers having short or long messages. The operating environment in which this mode is optimum is the same as the one for which token-passing protocol is optimum. However, the present invention is an improvement on token passing systems in the prior art in that it does not need complex algorithms to recover from node failures since it does not pass a token and that it allows unequal bandwidth allocation without increasing waiting period if subscribers have different priorities.

In its third mode of operation, (Mode C), the present invention is used with variable message length and only contention message number assignment. In this mode the network can optimally accommodate low duty cycle subscribers having short or long messages. Further, the present invention permits allocation of subscribers to different sets of contention message numbers within a block depending on the priority and communication needs of the different groups of subscribers. For example, subscribers with higher priority are assigned more message numbers within a block or if all contention subchannels have the same bandwidth then less number of high priority subscribers are assigned to the same subchannel. In this mode the present invention not only optimally accommodates the same operating environment as the one for which the contention protocols are optimal, but also permits varying bandwidth allocation to different groups of subscribers.

In its fourth, fifth and sixth modes of operation, (Modes D, E and F, respectively), the present invention uses only fixed length messages. In Mode D both dedicated and contention assignment of message numbers is made, while in Mode E only dedicated and in Mode F only contention assignment of message numbers is made. In these modes, the present invention can optimally accommodate the operating environments for which cyclic time-division systems are optimum. However, the present invention is an improvement on the cyclic time-division systems in the prior art in that it does not need a central controller to synchronize all the subscribers. This eliminates the failure of the whole network due to outage of a single controller.

TABLE V

| Mode | Message Length | Message Number Assignment | | Performance Similar to: |
|---|---|---|---|---|
| | | Dedicated | Contention | |
| A | Variable | | | Combination of B and C |
| B | $B1 \leq ML \leq B2$ | | | Priority Token passing |
| C | | | | Priority CSMA/CD[1] |
| D | Fixed | | | Dual Mode |
| E | $ML = B1 = B2$ | | | TDMA[2] Reservation TDMA[2] |
| F | | | | Contention TDMA[2] |

Notes:
[1]Carrier Sense Multiple Access — Collision Detection
[2]Time Division Multiple Access In order to coordinate the operation of the entire network, a single NIU/subscriber device pair may act as a network monitor unit (NMU) and control the assignment of message numbers and monitor the status of, and manage the various elements of, the digital communication system. The actual device may be a separate computer element or a program executed on the processor within the subscriber interface of a NIU. The functions of the NMU are broken up into two classes: monitor functions and management functions. The monitor functions collect and maintain the following information: a directory of network addresses of subscriber devices performing different services (printing, storage, etc.); a connection table which is a record of the virtual circuits on the network; history of network activity for fault isolation, failure recovery and billing; status of NIUs and subscriber devices; and the traffic load on the different sets of message number assignments. The management functions include remote diagnosis of the various elements of the network, setting up of virtual connections between the subscriber devices, down line loading of programs to be executed in the subscriber interfaces, allocating transmission message numbers to NIUs, assigning pacer function to a specific NIU and routing of messages between networks. The allocation of transmission message numbers based on traffic load on the different sets of message number assignments may be automatic or may require operator action. Further, adaptation to traffic load is also accomplished within each NIU using a distributed algorithm explained above. The NMU is not an essential element of an implementation of the access method of the present invention; however, it does enhance the controllability of the network.

Having described one preferred embodiment of the present invention, it is now apparent to those skilled in the art that numerous other embodiments are contemplated as falling within the scope of this invention. The following are some examples of such embodiments. (1) A centralized pacing function using a stand-by back-up unit to avoid the distributed pacer selection process. (2) A subscriber, depending on its priority, is allowed to transmit multiple messages in its message number with the last message signifying the end of transmission, or is required to limit the length of its message. (3) Use of a message number field in every message with centralized or decentralized pacing. With a message number field in every message, the pacer could check the message number in every error-free message and send an error message to the subscriber that transmits a message with an incorrect message number and force that subscriber to re-block-synchronize. (4) Use of programmable number of bits for each fields of a message. (5) Use of an algorithm which allows each subscriber to adjust its transmission to network traffic depending on the subscriber's priority. (6) Implementation of a message number allocation procedure which automatically adds and deletes subscribers. One such procedure is available as an option in the preferred embodiment. These are some of the several possible embodiments of the Adaptable Message Division Multiple Access technique.

What is claimed is:

1. In a digital communication system having a signal communication network and a plurality of subscriber devices for transmitting information on, and receiving inforamtion from, said network in a plurality of variable-length information messages each having a start time, the improvement wherein said system comprises
   means for associating with each subscriber device at least one message number selected from a group of message numbers which are sequentially numbered, and each one of said subscriber devices comprises,
   means responsive to predetermined information in at least one of said messages for generating a message count indicative of a message number associated with the message transmitted on said network at the time the count is generated, and
   means responsive to the start times of messages on said network and responsive to said message count for transmitting a message on said netork a predetermined time interval after the start of the passage was transmitted on the network by the subscriber device associated with the message number immediately preceding a message number associated with said one subscriber device,
   said associating means comprising means associated with each subscriber unit and operable temporarily to perform said message number association,
   said associating means comprising means for associating each message number with either only one subscriber device or with a plurality of subscriber devices.

2. In a digital communication system as set forth in claim 1 including means responsive to the absence of a signal for a predetermined period of time during a message number to cause incrementing of said message count.

3. In a digital communication system, the improvement according to claim 1 wherein said generating means comprises means responsive to a message number code in each of said messages for generating said message count.

4. In a digital communication system, the improvement according to claim 1 wherein said generating means comprises a counter and means responsive to said start times of each of said messages transmitted on said network for incrementing said counter.

5. In a digital communication system having a signal communication network and a plurality of subscriber devices for transmitting information on, and receiving information from, said network in a plurality of variable-length information messages each having a start time, the improvement wherein said system comprises
   means for associating with each subscriber device at least one message number selected from a group of message numbers which are sequentially numbered, and each one of said subscriber devices comprises
   means responsive to predetermined information in at least one of said messages for generating a message count indicative of a message number associated with the message transmitted on said network at the time the count is generated, and
   means responsive to the start time of messages on said network and responsive to said message count for transmitting a message on said network a predetermined time interval after the start of the message was transmitted on the network by the subscriber device associated with the message number immediately preceding a message number associated with said one subscriber device,
   said transmitting means comprising
   means responsive to said message count and to the start times of said messages for determining the start time of the message transmitted on the network by the subscriber device associated wtih the message number immediately preceding a message number associated with said one subscriber device,
   circuit means operable for transmitting a message on said network, and
   means for operating said circuit means after a selected time interval following start of said last-mentioned start time.

6. In a digital communication system, the improvement according to claim 5 wherein said operating means is responsive to information in said message transmitted on the network by the subscriber device associated with the message number immediately preceding a message number associated with said one subscriber device for computing said selected time interval.

7. In a digital communication system, the improvement according to claim 5 wherein said selected time interval is fixed and determined during start-up process.

8. In a digital communication system, the improvement according to claim 1 wherein said message numbers are allocated centrally, distributed, or automatically.

9. In a digital communication system having a signal communication network and a plurality of subscriber devices, each of said subscribers devices capable of transmitting on, and receiving from, said communication network information messages of variable length, the improvement comprising, means for assigning to each subscriber one or more message numbers from a group of messages which are sequentially numbered, means associated with each subscriber and responsive to information in said messages for generating a message count indicating the message number at that time on the network to the subscriber presently transmitting on said network, and means associated with at least one subscriber at any one time for regularly transmitting a message on said network wherein said message includes the message number at that time on the network, means associated with each one of said subscribers for synchronizing said one subscriber to the operation of said network, said synchronizing means comprising means responsive a length information in a message for calculating the start time of the net message by adding to a length determined from said said length information in said message a predetermined guard time, means for examining said network to detect the actual start of the next message during a predetermined time window occurring substantially at said calculated start time, and means for signaling an error condition if said actual start time is not detected within said time window.

10. In a digital communication system as set forth in claim 9 wherein each of said messages has a distinct start time and a distinct end time, the improvement according to claim 12 further comprising means associated with each of said subscriber devices and responsive to the start times of messages on said network and responsive to said message count for transmitting a message on said network a predetermined time interval after the start of a message was transmitted on the network by the subscriber device associated with the message number immediately preceding a message number associated with said one subscriber device.

11. In a digital communication system, the improvement according to claim 10 wherein said transmitting means comprises means responsive to said message count, to the start times of said messages and to the start time of the message associated with the message number immediately preceding a message number associated with said one subscriber device for determining the start time of the message transmitted on the network by the subscriber device, circuit means operable for transmitting a message on said network, and means for operating said circuit means after a selected time interval following said last-mentioned start time.

12. In a digital communication system, the improvement according to claim 11 wherein said operating means is responsive to information in said message transmitted on the network by the subscriber device associated with the message number immediately preceding a message number associated with said one subscriber device for computing said selected time interval.

13. In a digital communication system, the improvement according to claim 11 wherein said selected time interval is fixed and determined during the start-up process.

14. In a digital communication system, the improvement according to claim 9 wherein said regularly transmitting means is permanently associated with one subscriber.

15. In a digital communication system, the improvement according to claim 9 wherein said regular transmitting means is temporarily associated with each subscriber.

16. In a digital communication system, the improvement according to claim 9 including means responsive to the absence of a signal for a predetermined period of time during a message number to cause incrementing of said message count.

17. In a digital communication system, the improvement according to claim 9 wherein said message numbers are allocated centrally, distributed, or automatically.

18. In a digital communication system having a digital signal network and a plurality of subscribers each of said subscribers capable of transmitting on and receiving from said network variable-length information messages each having a start time, the improvement comprising:

means for assigning to each subscriber at least one message number from a group of message numbers which are sequentially numbered, means associated with each one of said subscribers for evaluating the digital length of a message to be transmitted and for inserting coded information specifying said length into each message transmitted by said one subscriber, and means associated with each one of said subscribers and responsive to the start time of a message on said network and to said length information in said preceding message for calculating the end of said preceding message in order to determine when to start transmission.

19. In a digital communication system, the improvement according to claim 18 further comprising means associated with each one of said subscribers for synchronizing said one subscriber to the operation of said network, said synchronizing means comprising means responsive a length information in a message for calculating the start time of the next message by adding to a length determined from said said length information in said message a fixed, predetermined guard time, means for examining said network to detect the actual start of the next message during a predetermined time window occurring substantially at said calculated start time, and means for signaling an error condition if said actual start time is not detected within said time window.

20. In a digital communication system having a digital signal network and a plurality of subscribers each of said subscribers capable of transmitting on and receiving from said network variable-length information messages each having a start time, the improvement comprising:

means for assigning to each subscriber at least one message number from a group of message numbers which are sequentially numbered, means associated with each one of said subscribers for evaluating the digital length of a message to be transmitted and for inserting coded information specifying said length into each message transmitted by said one subscriber, and means associated with each one of said subscribers for synchronizing said one subscriber to the operation of said network, said synchronizing means comprising means responsive to the length of information in a message for calculating the start time of the next message by adding to a length determined from said said length information in said message a predetermined guard time, means for examining said network to detect the actual start of the next message during a predetermined time window occurring substantially at said calculated start time, and means for signaling an error condition if said actual start time is not detected within said time window.

21. In a digital communication system, the improvement according to claim 20 wherein said guard time is fixed.

22. In a digital communication system, the improvement according to claim 20 including means responsive to the absence of a signal for a predetermined period of time during a message number to cause incrementing of said message of said count.

23. In a digital communication system, the improvement according to claim 20 wherein said message numbers are allocated centrally, distributed, or automatically.

24. In a digital communication system, the improvement according to claim 20 wherein the retransmission mode is a function of allocation type between dedicated and contention.

25. A digital communication system comprising, a signal communication network, a plurality of subscriber devices for transmitting information on, and receiving information from, said network in a plurality of variable-length information messages each having a start time, means for associating with each subscriber device at least one message number selected from a group of message numbers which are sequentially numbered, each one of said subscriber devices comprising a counter, means responsive to said start times of each of said messages transmitted on said network for incrementing said counter, means responsive to said message count, to the start times of the messages and to the start time of the message associated with the message number immediately preceding a message number associated with one of said subscriber devices, for determining the start time of the message transmitted on the network by said subscriber device, means operable for transmitting a message on said network, and means for operating said transmitting means after a selected time interval following said last-mentioned start time.

26. A digital communication system according to claim 25 wherein said associating means comprises means for associating each message number with only one subscriber device.

27. A digital communication system according to claim 25 wherein said associating means comprises means for associating at least one message number with a plurality of subscriber devices.

28. A digital communication system according to claim 27 wherein said means for associating comprises means responsive to a message number code in each of said messages for generating said message count.

29. A digital communication system according to claim 25 further comprising means associated with at least one subscriber for regularly transmitting a message on said network wherein said message includes the message number associated with said message.

30. A digital communication system according to claim 29 further comprising, means associated with each one of said subscribers for evaluating the digital length of a message to be transmitted and for inserting coded information specifying said length into each message transmitted by said one subscriber, and means associated with each one of said subscribers and responsive to the start time of a message on said network and to said length information in said preceding message for calculating the end of said preceding message in order to determine when to start transmission.

31. In a digital communication system according to claim 25 wherein said message numbers are allocated centrally, distributed, or automatically.

32. In a digital communication system according to claim 25 wherein said retransmission is a function of allocation type as to dedicated or contention.

33. A digital communication system according to claim 29 further comprising, means associated with each one of said subscribers for synchronizing said one subscriber to the operation of said network, said synchronizing means comprising means responsive a length information in a message for calculating the start time of the next message by adding to a length determined from said said length information in said message a fixed, predetermined guard time, means for examining said network to detect the actual start of the next message during a predetermined time window occurring substantially at said calculated start time, and means for signaling an error condition if said actual start time is not detected within said time window.

34. A digital communication system comprising, means defining a signal communication link, a plurality of subscriber devices, each of said subscriber devices being assigned a unique address, means for assigning to each subscriber device at least one message number selected from a group of message numbers which are sequentially numbered from zero to a predetermined number, N, a plurality of network interface units each of said network interface units coupling at least one subscriber device to the communication means so that said subscriber can transmit information on and receive information from said communication means, said information being transmitted on said bus means in information messages each having a distinct start time and a distinct end time, each of said network interface units comprising, data processing means, means operable for transmitting a plurality of network messages, each message containing information indicating a destination address and the length of said message, means connected to said communication means for receiving messages, said receiving means including means for identifying and decoding said destination address and means for identifying and storing said message length, a counter generating a message count, means responsive to said start times of each of said messages transmitted on said network for incrementing said counter, means responsive to said message count, to the start times of said messages and to the start time of the messages with the message number immediately preceding a message number associated with said one network interface unit for determining the start time of the message transmitted on the network by said subscriber device, means for operating said transmitting means after a selected time interval following said last-mentioned start time.

35. A digital communication system according to claim 34 wherein said communication link comprises a two-way bus.

36. A digital communication system according to claim 34 wherein said communication link comprises two one-way busses.

37. A digital communication system according to claim 34 including means responsive to the absence of a signal for a predetermined period of time during a message number to cause incrementing of said message count.

38. A digital communication system according to claim 34 wherein said message numbers are allocated centrally, distributed or automatically.

39. A digital communication system according to claim 34 wherein retransmission is a function of allocation type as to whether dedicated or contention.

40. A digital communication system according to claim 34 further comprising means associated with at least one subscriber for regularly transmitting a message on said network wherein said message includes a pace number equal to the message number at that time on the network.

41. A digital communication system according to claim 40 wherein each of said network interface units further comprises means for block synchronizing said one network interface unit, said synchronizing means comprising means for periodically comparing said pace number to said message count, and means for generating a block synchronization signal if a match is obtained a predetermined number of times.

42. A digital communication system according to claim 41 wherein each of said network interface units further comprises means responsive to said block synchronization signal and to said message count for enabling message transmission only in the message numbers assigned thereto.

43. A digital communication system according to claim 34 wherein the same message number is assigned to only one subscriber in a dedicated mode.

44. A digital communication system according to claim 34 wherein the same message number is assigned to multiple subscribers in a contention mode.

45. A digital communication system according to claim 34 wherein said message length information is coded in a digital code with multiple bits that designate the length of that message.

46. A digital communication system according to claim 45 wherein said receiving means further comprises means responsive to a message length code in a message for predicting the end of the that message and means responsive to said predicted end of message for preparing said transmission means for transmission at substantially said predicted time when the next message number is assigned to the network interface unit associated therewith.

47. A digital communication system according to claim 34 wherein said data processing means is operable in one of a plurality of different modes of operation including a first mode having variable message length and both dedicated and contention assignment of message numbers.

48. A digital communication system according to claim 47 wherein said data processing means is operable in a second mode having variable message length but only dedicated message number assignment.

49. A digital communication system according to claim 47 wherein said data processing means is operable in a third mode having variable message length but only contention message number assignment.

50. A digital communication system according to claim 47 wherein said data processing means is operable in a fourth mode having fixed length messages and both dedicated and contention assignment of message numbers.

51. A digital communication system according to claim 47 wherein said data processing means is operable in a fifth mode having fixed length messages but only dedicated message number assignment.

52. A digital communication system according to claim 47 wherein said data processing means is operable in a sixth mode having fixed length messages but only contention message number assignment.

53. A digital communication system according to claim 34 including a system head-end coupled between the inbound and outbound bus means.

54. A digital communication system according to claim 53 wherein said head-end comprises means for filtering signals transmitted from said network interface units on said inbound bus means and means for re-transmitting said filtered signals on said outbound bus means.

55. A digital communication system according to claim 34 wherein said message also includes originator address and message synchronization information and an information code indicating whether said message is a data message type or a control message type.

56. A digital communication system according to claim 55 wherein said receiving means includes means for transfering selected information in a message to an associated subscriber device when said message is a data message type and for processing said selected information therein when said message is a control message type.

57. A digital communication system according to claim 34 wherein each of said messages includes a header portion having control information therein and a data portion having data information therein and said receiving means further comprises means for detecting errors separately in both said header protion and said data portion of said message.

58. A digital communication system according to claim 34 wherein said network interface unit further comprises a media access unit for converting signals on said bus means to signals internally usable in said network interface unit and subscriber interface means for converting said internally usable signals into signals usable by said associated subscriber.

59. A digital communication system according to claim 58 wherein said media access unit comprises a radio-frequency modem.

60. A digital communication system according to claim 34 wherein said data processing means further comprises a control store for storing program steps, a central processing unit operable in accordance with said program steps to control and coordinate the operation of said data processing means, a programmable read-only memory for storing information relating to the operation of the associated subscriber units, a pipeline, a sequencer and and processor bus means for controlling and regulating information flow between said control store, said central processing unit and said read-only memory.

61. A digital communication system according to claim 60 wherein said network interface unit further comprises an input random access memory coupled to said receiving means for storing signals received from said communication means, an output random access memory coupled to said transmitting means for storing signals which are generated by said associated subscribers, and a direct memory access controller for controlling the transfer of information from said subscribers to said output random access memory.

62. A digital communication system according to claim 61 wherein said direct memory access controller further controls transfer of data from said input random access memory to said subscriber device.

63. In a digital communication system as set forth in claim 1 including means for detecting the occurrence of a transmission error responsive to the error to cease transmission after a certain minimum period of transmission.

64. In a digital communication system as set forth in claim 9 including means for detecting the occurrence of a transmission error responsive to the error to cease transmission after a certain minimum period of transmission.

65. In a digital communication system as set forth in claim 18 including means for detecting the occurrence of a transmission error responsive to the error to cease transmission after a certain minimum period of transmission.

66. In a digital communication system as set forth in claim 20 wherein said means for signalling an error condition includes means for detecting the occurrence of a transmission error and responsive to the error to cease transmission after a certain minimum period of transmission.

67. A digital communication system as set forth in claim 25 including means for detecting the occurrence of a transmission error responsive to the error to cease transmission after a certain minimum period of transmission.

68. A digital communication system as set forth in claim 34 including means for detecting the occurrence of a transmission error responsive to the error to cease transmission after a certain minimum period of transmission.

* * * * *